US007136240B2

(12) United States Patent
Yoshida et al.

(10) Patent No.: US 7,136,240 B2
(45) Date of Patent: Nov. 14, 2006

(54) MAGNETIC DISK DRIVE WITH PARAMETER SETTING

(75) Inventors: Noboru Yoshida, Kanagawa (JP); Masato Taniguchi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/050,397

(22) Filed: Feb. 2, 2005

(65) Prior Publication Data

US 2005/0162769 A1 Jul. 28, 2005

(51) Int. Cl.
*G11B 20/10* (2006.01)

(52) U.S. Cl. ...................................... 360/39
(58) Field of Classification Search .................. 360/39, 360/75, 69, 97.02, 25; 369/13.02, 53.11; 700/44, 300; 702/132; 708/322; 324/760; 330/149; 372/34; 374/102
See application file for complete search history.

(56) References Cited

U.S. PATENT DOCUMENTS

| | | | | |
|---|---|---|---|---|
| 5,381,359 A | * | 1/1995 | Abbott et al. | 708/322 |
| 6,006,168 A | * | 12/1999 | Schumann et al. | 702/132 |
| 6,088,662 A | * | 7/2000 | Flinsbaugh et al. | 702/132 |
| 6,270,252 B1 | * | 8/2001 | Siefert | 374/102 |
| 6,409,090 B1 | * | 6/2002 | Gilvar et al. | 237/2 A |
| 6,445,963 B1 | * | 9/2002 | Blevins et al. | 700/44 |
| 6,489,793 B1 | * | 12/2002 | Jones et al. | 324/760 |
| 6,515,949 B1 | * | 2/2003 | Masaki et al. | 369/53.11 |
| 6,574,065 B1 | * | 6/2003 | Sri-Jayantha et al. | 360/75 |
| 6,647,321 B1 | * | 11/2003 | Nagashima et al. | 700/300 |
| 6,671,232 B1 | * | 12/2003 | Stupp | 369/13.02 |
| 2004/0091005 A1 | * | 5/2004 | Hofmeister et al. | 372/34 |
| 2004/0164798 A1 | * | 8/2004 | Adachi et al. | 330/149 |

FOREIGN PATENT DOCUMENTS

| | | |
|---|---|---|
| JP | 05-006506 | 1/1993 |
| JP | 09-102102 | 4/1997 |

* cited by examiner

*Primary Examiner*—Fred F. Tzeng
(74) *Attorney, Agent, or Firm*—Townsend and Townsend and Crew LLP (57) ABSTRACT

Embodiments of the invention are directed to setting optimum FIR filter coefficients. In one embodiment, a POR (Power On Reset) control block acquires temperature data from a thermistor. If the temperature is the first to have been detected as falling within a low temperature range, a filter coefficient determining block in a read/write channel determines filter coefficients of a FIR filter by using the signal acquired from the magnetic disk. The determined filter coefficients are set to the FIR filter. If the temperature data does not satisfy the above-mentioned condition, filter coefficients registered in a filter coefficient table are set to the FIR filter.

26 Claims, 7 Drawing Sheets

| Temperature | Filter Coefficients |
|---|---|
| H (45°C~) | $(h_{H0}, \cdots h_{H6})$ |
| M (20°C~45°C) | $(h_{M0}, \cdots h_{M6})$ |
| L (~20°C) | ———————— |

451 452

(b)

| Temperature | Filter Coefficients |
|---|---|
| H (45°C~) | $(h_{H0}, \cdots h_{H6})$ |
| M (20°C~45°C) | $(h_{M0}, \cdots h_{M6})$ |
| L (~20°C) | $(h_{L0}, \cdots h_{L6})$ |

FIG. 6
601. Acquire Temperature Data
602. Temperature Data Falls within Low Temperature range in Table 602?
603. Determine Filter Coefficients by Referring to Table
604. Set Filter Coefficients to Register Group
605. Set Filter Coefficients in Register Group to FIR Filter
606. Initially Detected Temperature Data in Low Temperature range?
607. Determine to Execute Filter Coefficient Determining Process by Filter Coefficient Determining Block
608. Filter Coefficient Determining Process
609. Set Filter Coefficients to FIR Filter
610. Register Filter Coefficients in Table

Fig.7

FIG. 7
701. Acquire Temperature Data
702. Temperature Data Falls in Low Temperature range in Table?
703. Set Filter Coefficients in Table to Register Group
704. Set Filter Coefficients in Register Group to FIR Filter
705. Lower than Past Temperature Data by More than Predefined Amount?
706. Determine to Execute Filter Coefficient Determining Process by Filter Coefficient Determining Block

MAGNETIC DISK DRIVE WITH PARAMETER SETTING

CROSS-REFERENCES TO RELATED APPLICATIONS

Not Applicable.

BACKGROUND OF THE INVENTION

The present invention relates to data storage devices, storage device control methods and magnetic disk drives and, more particularly, to data storage devices, storage device control methods and magnetic disk drives in which the setting of read operation parameters is controlled.

Devices using various types of media such as optical disks and magnetic tapes are known as information recording and reproducing devices. Among them, hard disk drives have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, removable memories for digital cameras and so on.

Each magnetic disk used in hard disk drives has a plurality of tracks formed concentrically and each track is partitioned into a plurality of sectors. In each sector, sector address information and user data are stored. Either data write to a sector or data read from the sector is enabled by the head which accesses the desired sector according to the sector address information. A signal read out from a magnetic disk through data read operation is subjected to waveform shaping, decoding processing and other prescribed signal processing by a signal processing circuit before being transmitted to the host. Typically, a signal from a head is subjected to waveform equalization processing by an analog filter, converted to a digital signal by an AD converter and again subjected to waveform equalization processing by a waveform equalizer. Further, the signal from the waveform equalizer is subjected to decoding processing and demodulating processing.

It is possible that data cannot be read out accurately from a magnetic disk in the read operation. This is attributable to optimum read operation parameters which vary depending on the operating condition, particularly the temperature to which the hard disk drive is exposed. It is known that the amplitude and width of an analog waveform signal retrieved from the magnetic disk depend on magnetic characteristics (coercivity, residual magnetization, etc.) of the magnetic disk and the head-to-disk distance. The head-to-disk distance, magnetic disk's coercivity, MR head's resistance sensitivity and so on change with temperature. Accordingly, the characteristics of the reproduced waveform signal also change with temperature.

As such, techniques for detecting the temperature and changing parameters according to the detected temperature are known (for example, see Japanese Patent Laid-Open No. 9-102102). In that Japanese reference, a disk controller receives temperature data generated through a temperature sensor and an A/D converter. Further, pre-record compensation amount data, record current magnitude data, analog pre-filter cutoff frequency data, analog pre-filter equalization coefficient data and waveform equalizer coefficient data, which depend on the temperature, are respectively sent from the disk controller to the pre-record compensation amount setting register, record current magnitude setting register, analog pre-filter cutoff frequency setting register, analog pre-filter equalization coefficient setting register and waveform equalization coefficient setting register. With this, the pre-record compensation circuit, record current generation circuit, analog pre-filter and waveform equalizer can be set optimally according to the changing temperature. Thus the magnetic disk device can operate under optimum condition regardless of temperature fluctuations.

BRIEF SUMMARY OF THE INVENTION

Conventionally, parameters are appropriately determined for different temperatures through manufacturing test in the stage of manufacture. To appropriately determine the parameters, tests must be performed at predefined temperatures with a hard disk drive set up in a temperature-controlled chamber. In the stage of manufacture, however, such a temperature-controlled chamber is not always available. In particular, chambers enabling low temperature testing are often not prepared for cost and other reasons.

If parameters cannot be determined by the manufacturing test, parameters for expected temperatures are determined according to a conversion formula from parameters determined by the test for other temperatures. However, since parameters determined by such a conversion formula are inferior in accuracy to those by the actual test, difference may occur between parameters optimum for expected temperatures and those determined by a conversion formula. In addition, parameters are subject to the manufacturing variation of ICs and heads used in the hard disk drive. It is therefore preferable to determine appropriate parameters in the operating environment of the hard disk drive.

With the above-mentioned situation behind, the present invention was devised. It is a feature of the present invention to effectively control the storage device's data read operation according to the operating condition.

According to a first aspect of the present invention, there is provided a control method for a storage device having a data storage medium, comprising: (a) detecting temperatures; (b) based on the temperature detected in step (a), determining whether to execute a parameter setting process based on a signal to be read out from the medium; (c) if it is determined to execute the parameter setting process in step (b), reading out a signal from the medium; (d) performing signal processing on the signal read out from the medium; (e) based on the result of said signal processing in step (d), determining parameters for said signal processing which is to be performed on the signal to be read out from the medium; and (f) setting the determined parameters. The parameter setting process using the signal from the medium is controlled based on the temperature. This enables appropriate parameter setting.

Preferably, the signal processing in step (d) includes waveform equalization processing by a waveform equalizer and said determined parameters are waveform equalization coefficients of the waveform equalizer. Also preferably, the control method further comprises acquiring parameters which are stored and associated with the detected temperature in step (a) if it is determined in step (b) not to execute said parameter setting process and the step (f) sets the acquired parameters.

In some embodiments, it is determined in step (b) to execute said parameter setting process if the temperature detected in step (a) is included in a predefined temperature range. It is determined in step (b) to execute said parameter setting process if the temperature detected in step (a) is included in a predefined temperature range and said parameter setting process has not been executed for the predefined temperature range based on data read out in the past from the medium.

In specific embodiments, the control method further comprises registering the parameters determined in step (e) in a table in association with the temperature. The parameters determined in step (e) are registered in the table in association with the temperature detected in step (a); and after the parameters are registered in the table, if a temperature associated with the registered parameters is detected, the registered parameters are set. If it is determined in step (b) not to execute said parameter setting process, parameters determined from previously stored data are set in step (f).

According to a second aspect of the present invention, there is provided a data storage comprising: a medium for storing data; a temperature detecting section for detecting temperatures; a signal processing section for performing signal processing on a signal read out from the medium; a parameter setting section which based on the result of said signal processing, determines parameters for said signal processing which is to be performed on the signal to be read out from the medium, and sets the determined parameters to the signal processing section; and a control section which based on the temperature detected by the temperature detecting section, controls the execution of the parameter setting process by the parameter setting section. The parameter setting process using the signal from the medium is controlled based on the temperature. This enables appropriate parameter setting.

Preferably, based on the temperature detected by the temperature detecting section, the control section determines whether to execute the parameter setting process by the parameter setting section. Also preferably, the control section controls the parameter setting process so as to execute the parameter setting process if the temperature detected by the temperature detecting section falls within a predefined temperature range.

In some embodiments, the data storage device further comprises a table in which parameters are stored in association with temperatures and depending on the temperature detected by the temperature detecting section, parameters stored in the table in association with the detected temperature are set to the signal processing section by the control section. When the parameter setting process is not to be executed by the parameter setting section, parameters stored in the table in association with the temperature detected by the temperature detecting section are set to the signal processing section by the control section.

In specific embodiments, parameters determined by the parameter setting section are registered in the table by the control section. The parameters are registered in the table by the control section in association with the temperature detected by the temperature detecting section and if the temperature detected by the temperature detecting section is associated with said parameters registered in the table, said parameters are set to the signal processing section by the control section.

In some embodiments, the signal processing section has a FIR filter and the parameter setting section sets filter coefficients to the FIR filter. If a temperature falling within a predefined temperature range is detected for the first time, the control section controls the parameter setting section so as to execute the parameter setting process.

According to a third aspect of the present invention, a magnetic disk drive comprises: a magnetic disk for storing data; a magnetic head which detects a magnetic signal from the magnetic disk and converts the magnetic signal to an electrical signal; a signal processing section which performs signal processing on the signal from the magnetic disk; and a signal processing control section which controls the signal processing of the signal processing section. The signal processing section also comprises: an analog filter which performs waveform equalization processing on the signal from the magnetic head; an AD converter which converts the signal from the analog filter to a digital signal; and a FIR filter which performs waveform equalization processing on the signal from the AD converter. The signal processing control section also comprises: a temperature detecting section for detecting temperatures; a filter coefficient determining section which appropriately determines filter coefficients of the FIR filter by using the signal from the signal processing section; and a control section which, if the temperature detected by the temperature detecting section is a predefined temperature, controls the filter coefficient determining section so as to appropriately determine the filter coefficients and sets the determined filter coefficients to the signal processing section. The filter coefficient determining process using an actual signal from the signal processing section is controlled based on the temperature. This enables appropriate filter coefficient setting.

In some embodiments, the control section has a table to store filter coefficients; filter coefficients determined by the filter coefficient determining section are registered in the table by the control section in association with a predefined temperature range; and if the predefined temperature range is detected by the temperature detecting section, the filter coefficients registered in the table are set to the signal processing section by the control section without processing by the filter coefficient determining section.

According to the present invention, it is possible to effectively control data read operations in a storage device.

DETAILED DESCRIPTION OF THE INVENTION

Embodiments of the present invention will thereinafter be described. The following describes how the present invention is applicable and is not intended to limit the scope of the present invention to the embodiments cited below. For clarification of the explanation, omission and simplification are made, where appropriate, in the following description and drawings. Those skilled in the art will be able to easily make modifications, additions and alternations to each element of the embodiments within the scope of the preset invention. Also note that identical reference numerals are used to designate identical elements that are common to the figures and redundant description is omitted as appropriate for clarification of the explanation.

Figure 1:
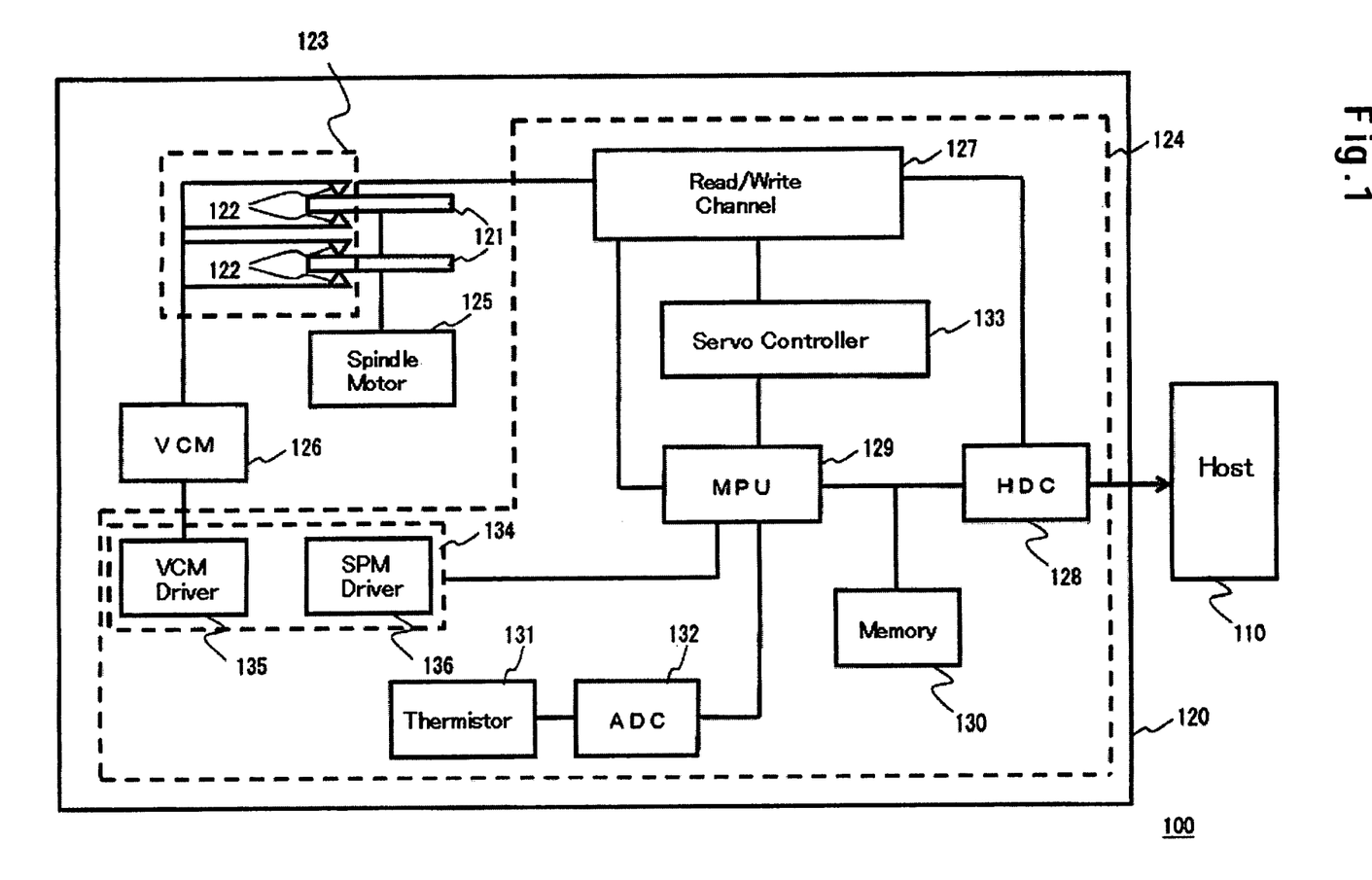
FIG. 1 is a block diagram illustrating the general configuration of a hard disk drive in an embodiment.

FIG. 1 is a block diagram showing a general configuration of a data processing system 100 in the present embodiment. The data processing system 100 has: a host 110 which is a computer, a digital camera or the like performing data processing; and a hard disk drive 120 which is a data recording and reproducing apparatus storing data transmitted from the host 110. In the frame of the hard disk drive 120, there is provided: one or more magnetic disks 121 as an example of a medium; a head stack assembly 123 having magnetic heads 122 associated respectively with the recording surfaces of the magnetic disk; and a controller 124 which controls these elements in order to write and read data to and from the magnetic disk 121.

Host user data transmitted from the host 110 is subjected to necessary processing and converted to a write signal by the controller 124 before being sent to the head stack assembly 123. According to the acquired write signal, the magnetic heads 122 write data to the recording surfaces of the magnetic disk 121. On the other hand, a read signal retrieved from the magnetic disk 122 by the magnetic heads 122 is converted to a digital signal and subjected to necessary processing by the controllers 124 before being transmitted to the host 110.

The magnetic disk 121 is a nonvolatile recording medium having magnetic layers which are magnetized to record data. When the hard disk 120 is operating, the magnetic disk 121 is driven to rotate at a prescribed constant speed around the spindle of the spindle motor 125. When the hard disk drive 120 is not operating, the magnetic disk 121 remains stationary. On the surfaces of the magnetic disk 121, plural tracks are concentrically formed as data storage partitions and each track is circularly partitioned into plural circular sectors.

Servo data recording areas are formed on the surfaces of the magnetic disk 121. Typically, the magnetic disk 121 has plural servo data recording areas formed radially. In each sector, a servo data recording area and a user data recording area are formed. Servo data is retrieved by the magnetic heads 122, making it possible to acquire information about the position of the magnetic heads 122. The servo data has track data providing track number information; sector data providing sector number information; and a burst pattern.

Mounted in the frame so as to be able to pivotally move along the surfaces of the magnetic disk 121, the head stack assembly 123 is driven by a voice coil motor (VCM) 126. Magnetic heads 122 each having a slider and a magnetic thin film element are provided at the tip of the head stack assembly 123. As the head stack assembly 123 pivotally moves, the magnetic heads 122 move in the radial direction of the magnetic disks 121 over the surfaces thereof. This allows the magnetic heads 122 to access a desired track.

The head stack assembly 123 has two magnetic heads 122 for each magnetic disk 121 and the two magnetic heads are respectively associated with the top and bottom surfaces of the magnetic disk 121. When data write/read operation is not made, the magnetic heads 122 are typically saved either to ramp structures (not shown in the figure) located outside the magnetic disk 121 or, in a CSS (Contact Start and Stop) system, to a CSS zone arranged in an inner place. The magnetic heads 122 write data to the magnetic disk 121 or read servo data and user data from the magnetic disk 121.

As shown in FIG. 1, the controller 124 has a read/write channel 127, a hard disk controller (HDC) 128, a microprocessor unit (MPU) 129, a memory 130, a thermistor 131 for temperature detection, an AD converter (ADC) 132 which AD-converts a signal from the thermistor 131, a servo controller 133, and a motor driver unit 134. The motor driver unit 134 has a voice coil motor driver (VCM driver) 135 and a spindle motor driver (SPM driver) 136.

The read/write channel 127 performs write operation on data acquired from the host 110. In a write operation, write data supplied from the hard disk controller 128 is code-modulated by the read/write channel 127. The thus code-modulated write data is then converted into a write signal (current signal) so that the write signal is supplied to the magnetic heads 122. The magnetic head 122 writes the data to the magnetic disk 121 by letting current flow through the coils according to the obtained signal. In addition, when data is to be supplied to the host 110, read operation is performed.

In a read operation, data is picked up from data supplied from the magnetic head 122 and subjected to decode processing by the read/write channel 127. The retrieved data, after being subjected to decode processing, is supplied to the hard disk controller 128. The read processing by the read/write channel 127 is executed according to parameters which are set by the MPU 129 or an internal certain circuit of the read/write channel 127. In addition, the read/write channel 127 appropriately determines the read processing parameters, in particular, coefficients of FIR (Finite Impulse Response) filters. The parameter setting processing by the read/write channel 127 will be described later in detail.

Operating according to microcodes loaded to the memory 130, the MPU 129 executes not only the general control of the hard disk drive 120, including magnetic head 122 positioning control, interface control and defect management, but also data processing-related necessary processing. In this embodiment, the MPU 129 executes temperature-based parameter setting processing for the read/write channel 127. The parameter setting processing includes not only setting previously stored parameters to the read/write channel 127 but also optimally determining parameters and setting them to the read/write channel 127. According to the temperature in the operating environment, parameters are appropriately set. This parameter setting processing will be described later in detail. When the hard disk drive 120 is started, the microcodes to operate on the MPU 129 and the data to be required for control and data processing are loaded to the memory 130 from the magnetic disk 121 or a ROM (not shown in the figure).

Digital data read out by the read/write channel 127 includes servo data in addition to user data from the host 110. The servo controller 133 extracts servo data from the readout data acquired from the read/write channel 127. The servo data has track data, sector data and a burst pattern. The extracted servo data is transferred to the MPU 129 from the servo controller 133. According to microcodes, the MPU 129 performs magnetic head 122 positioning control processing by using the servo data. Control data from the MPU 129 is output to the VCM driver 134. The VCM drier 134 supplies drive current to the VCM 126 according to the control signal.

In addition, the MPU 129 sets SPM control data to a register in the motor driver unit 134 according to microcodes in order to control the rotation of the spindle motor 125. The SPM driver 136 executes the rotational control of the spindle motor 125 according to the set SPM control data. The SPM driver 136 supplies a predefined waveform of drive current to the spindle motor 125 in order to rotate the spindle motor 125 in optimum condition. In addition, detection of the rotor position and rotation speed is executed in order to provide optimum rotational control.

The thermistor 131 is an example of a temperature detecting section and generates a temperature signal according to the detected temperature. The temperature signal is converted from an analog signal to digital data by the AD converter 132 and used by the MPU 129 for processing according to microcodes. The temperature data is used in controlling the magnitude of the current flowing through the coils when write operation is done by the magnetic head 122 to the magnetic disk 121. In addition, the temperature data is also used in setting parameters for data read processing in this embodiment as described later. Note that instead of the thermistor 131, it is possible to use another resistance thermometer, for example, a thermocouple thermometer, platinum resistance thermometer or the like.

The hard disk controller 128 has a capability of interfacing with the host 110. The hard disk controller 128 receives user data and read, write and other commands transmitted from the host 110. The received user data is transferred to the read/write channel 127. In addition, readout data from the magnetic disk, acquired from the read/write channel 127, is transmitted to the host 110 by the hard disk controller 128. Further, the hard disk controller 128 executes code generation processing for error checking and error correction of the user data acquired from the host 110. In addition, the hard disk controller 128 executes error correction processing on the readout data read out from the magnetic disk 121.

Figure 2:
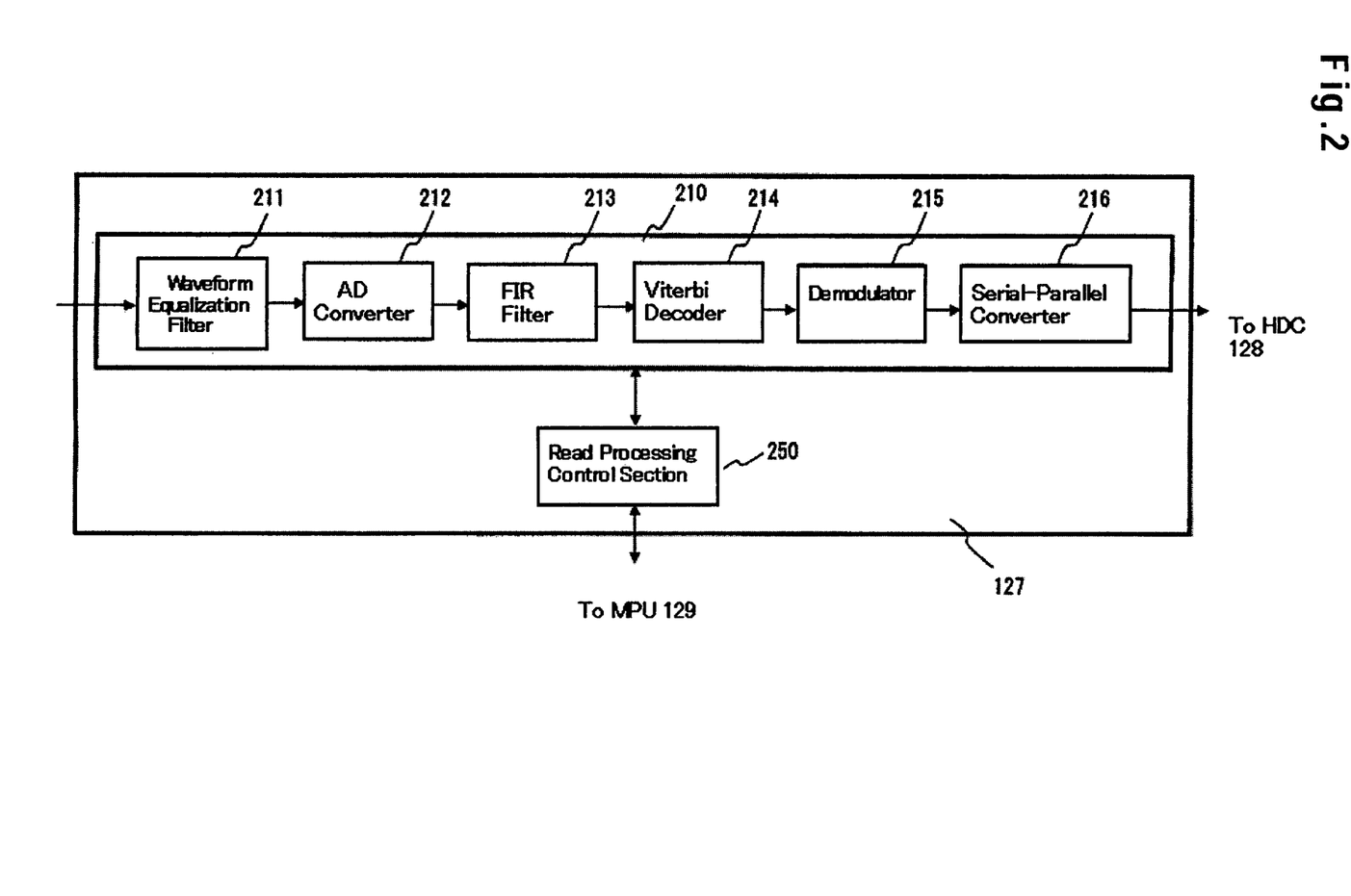
FIG. 2 is a block diagram illustrating a logical configuration which concerns the read processing in the read/write channel of this embodiment.

Parameter setting processing in this embodiment is described below. FIG. 2 is a block diagram showing a logical configuration which concerns the read processing by the read/write channel 127 in this embodiment. As shown in FIG. 2, the read/write channel 127 has a read processing section 210 which executes data read processing to read out data from the magnetic disk; and a read processing control section 250 which controls the data read processing of the read processing section 210. The read processing control section 250 can control the read processing by setting parameters of the read processing section 210.

First, the read processing to read out data from the magnetic disk 121 is described. As shown in FIG. 2, the read processing section 210 has a waveform equalization filter 211, an AD converter 212, a FIR filter 213, a Viterbi decoder 214, a demodulator 215 and a serial-parallel converter 216. The waveform equalization filter 211 performs waveform equalization processing on the input analog signal. The AD converter 212 samples and quantizes the analog signal. The FIR filter 213 is an example of a transversal filter and performs transversal equalization processing on the digital signal. The Viterbi decoder 214 performs decoding processing on the input data. The demodulator 215 demodulates the signal from the Viterbi decoder 214. The serial-parallel converter 216 converts the input serial data to parallel data.

The output from the magnetic heads 122 is input to the waveform equalization filter 211 via a variable gain amplifier (VGA) (not shown in the figure) composed of a head amplifier and AGC (Auto Gain Control). The waveform equalization filter 211 has a function as a low pass filter. In behalf of the subsequent signal processing, the waveform equalization filter 211 performs waveform equalization processing on the input signal, including removing noise from the input signal and slimming the signal waveform. The waveform equalization filter 211, according to the control data from the MPU 129, can change the high frequency gain, cutoff frequency and other read parameters. The waveform equalization filter 211 may use, for example, an Nth order equiripple filter. The output from the waveform equalization filter 211 is converted to a digital signal through sampling and quantization by the AD converter 212 and input to the FIR filter 213.

In order to enable accurate data restoration, the FIR filter 213 shapes and equalizes the input waveform to a target waveform. The configuration of and the processing by FIR filter 213 will be described later. The output signal of the FIR filter 213 is input to the Viterbi decoder 214. In the Viterbi decoder 214, the waveform equalized by the FIR filter is processed by a PRML (Partial Response Maximum Likelihood) processing circuit. As a result, a RLL (Run Length Limited) signal is generated. The Viterbi decoder 214 can determine the most likely data sequence by using a predetermined algorithm on the basis of the context of the input data sequence. The output signal from the Viterbi decoder 214 is input to the demodulator 215. The demodulator 215 restores the encoded RLL signal to the original one. The serial data demodulated by the demodulator 215 is converted to parallel data by the serial-parallel converter 216 and transferred to the HDC 128.

Figure 3:
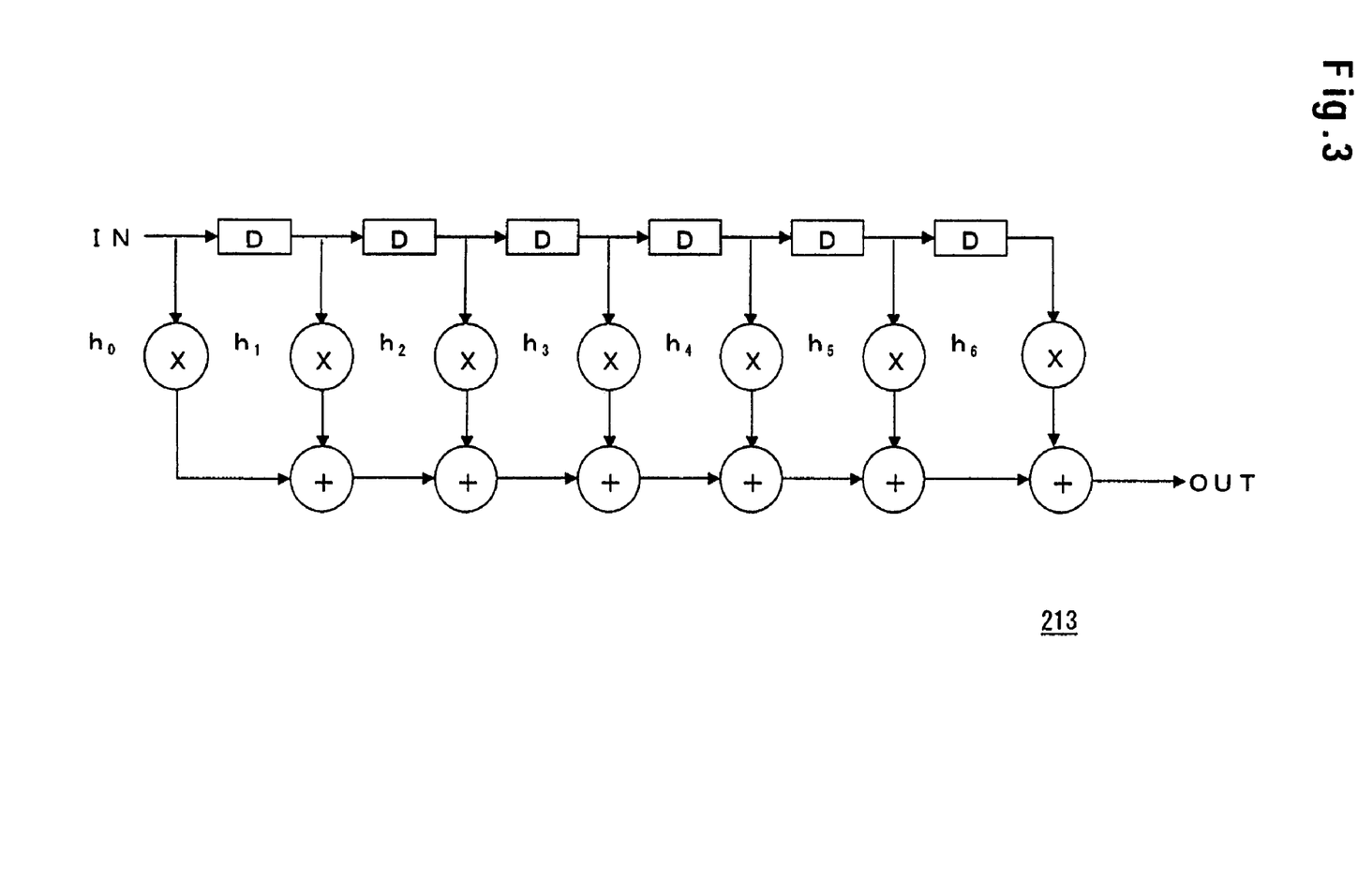
FIG. 3 is a block diagram illustrating an example of a FIR filter configuration in this embodiment.

Then, the read parameter setting process is described. A process of setting filter coefficients of the FIR filter 213 in this embodiment is described as a specific example of the read parameter setting process. In FIG. 3, an example of the FIR filter 213 configuration is shown. Shown exemplarily in FIG. 3 is a sixth-order FIR filter with a filter length of 7 (7 taps). An appropriate value is selected as the filter length (number of taps) according to the design. In FIG. 3, D is a delay operator to delay data by one clock. h0~h6 are filter coefficients as weighting functions at the respective taps. Filter coefficients h0~h6 correspond to the impulse response of the FIR filter 213.

As understood from FIG. 3, transfer function H(z) of the FIR filter 213 can be expressed as below:

$$H(z) = \Sigma h_n z_n$$

Each filter coefficient $h_n$ is programmable or can be changed by an instruction from the MPU 129. The MPU 129 can change the filter characteristics of the FIR filter 213. If appropriate values are determined as filter coefficients, it is possible to set the filter characteristics of the FIR filter 213 to appropriate characteristics according to the environmental condition and so on.

Figure 4:
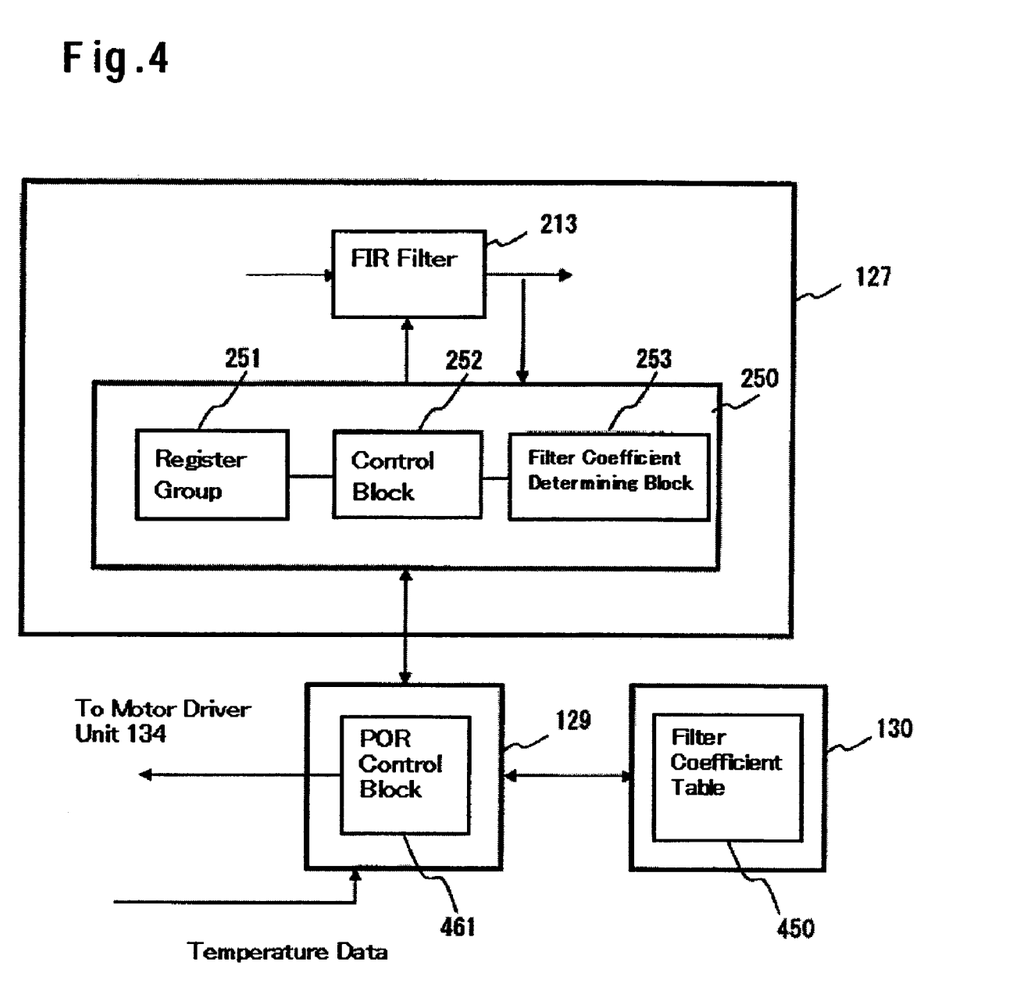
FIG. 4 is a block diagram illustrating a logical configuration which concerns a read parameter setting process in this embodiment.

FIG. 4 is a block diagram showing a logical configuration which concerns the read parameter setting process. As mentioned above, a process of setting filter coefficients of the FIR filter 213 in this embodiment is described as a specific example of the read parameter setting process. Filter coefficients are set to appropriate values based on the temperature. To enable accurate data readout, this setting of the FIR filter coefficients is useful since they are much subject to the manufacturing variation of the ICs and magnetic heads 122 and the temperature. In this example, the filter coefficient setting process is described as part of POR (Power On Reset) processing which is performed when the hard disk drive 120 is powered on. The POR procedure in this embodiment not only sets previously registered filter coefficients but also registers new filter coefficients in predefined condition.

The read processing control section 250 is provided with a plurality of components to control the data read processing. As shown in FIG. 4, the read processing control section 250 has a register group 251, a control block 252 and a filter coefficient determining block 253. In the register group 251, control data and commands from the MPU 129 or control data to be passed to the MPU 129 are stored. The control block 252 controls the operation of each component in the read/write channel 127. The filter coefficient determining block 253 determines the filter coefficients of the FIR filter 213 under the control of the control block 252.

In the memory 130, a filter coefficient table 450 is stored by which temperature data acquired from the thermistor 131 are associated with filter coefficients of the FIR filter 213. Operating according to microcodes, the MPU 129 can function as a POR control block 461. The POR control block 461 controls the POR procedure, and particularly in this embodiment, controls the process of setting filter coefficients of the FIR filter 213 based on the temperature. In the filter coefficient setting process, the POR control block 461 refers to the filter coefficient table 450 by using the temperature data acquired from the thermistor 131.

Figure 5:
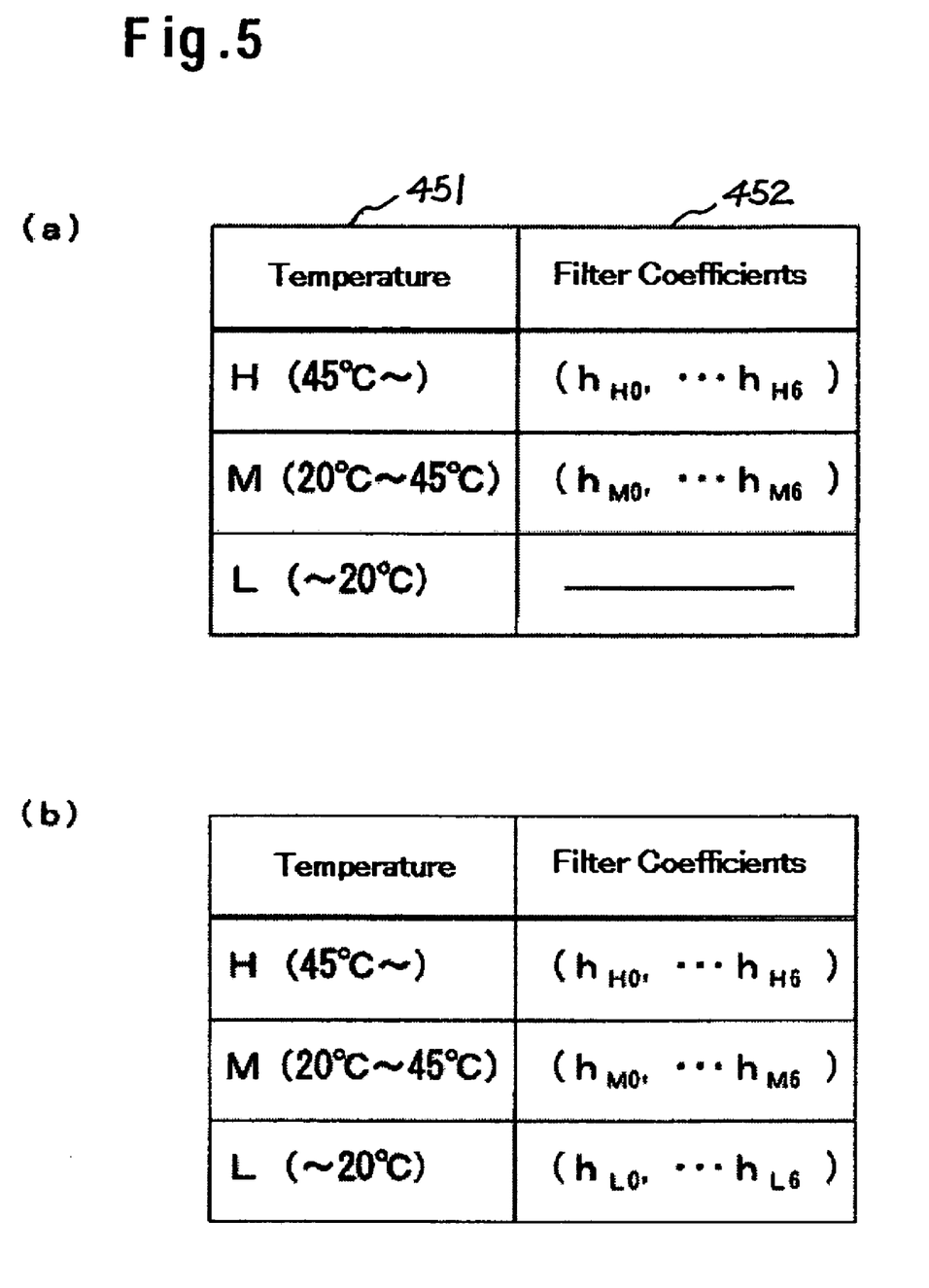
FIG. 5 shows an example of a filter coefficient table in this embodiment.

FIG. 5 shows an example of the filter coefficient table 450. In the filter coefficient table 450, there is provided a plurality of groups of temperature data 451 each of which is associated with one of filter coefficient sets 452. By dividing the temperature data 451 into a plurality of groups by the temperature level, it is possible to make the table size preferable. In FIG. 5, the temperature data 451 is exemplarily divided into three regions: a high temperature range beyond 45° C., a middle temperature range between 20° C. and 45° C. and a low temperature range below 20° C.

In FIG. 5(a), the high and middle temperature ranges are respectively associated with filter coefficient sets. The filter coefficients for the high and middle temperature ranges are optimally determined by manufacturing test and registered prior to shipment. No filter coefficients are registered yet in association with the low temperature range. As shown in FIG. 5(b), filter coefficients for the low temperature range are newly registered by the POR procedure if predefined condition occurs. As for the temperature ranges or divisions, appropriate partition is made practically in the stage of device design.

Figure 6:
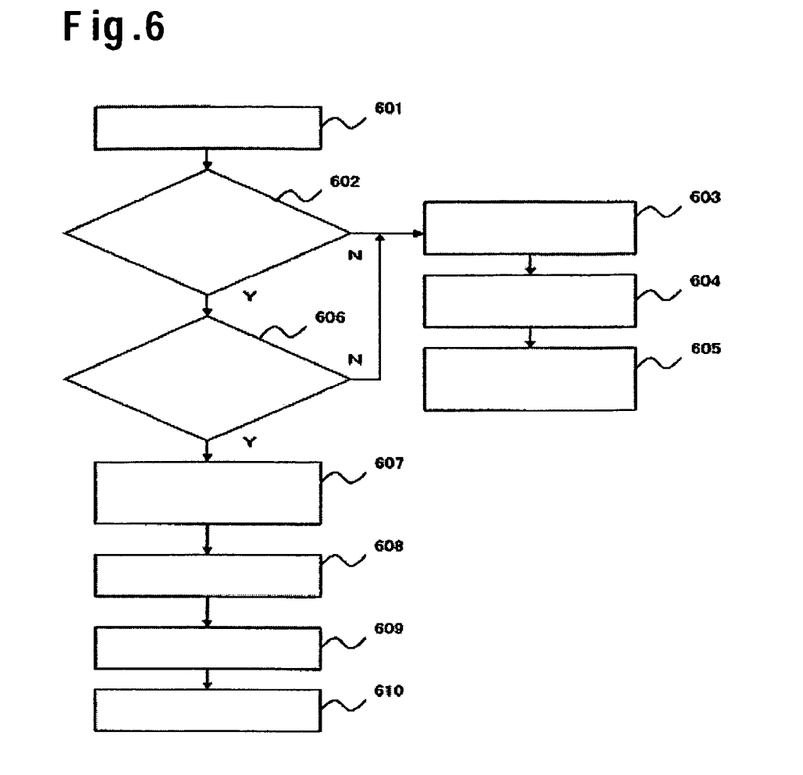
FIG. 6 is a flowchart illustrating a filter coefficient setting process in a POR procedure in this embodiment.

The filter coefficient setting process of the POR procedure is described with reference to a flowchart of FIG. 6. The POR control block 461 acquires temperature data from the thermistor 131 (S601). The POR control block 461 judges whether the temperature data falls within the low temperature range in the filter coefficient table 450 (S602). If the temperature data does not fall within the low temperature range in the filter coefficient table 450, the POR control block 461 determines filter coefficients for the acquired temperature data by referring to the filter coefficient table 450 (S603). The POR control block 461 sets the determined filter coefficients to the register group 251 in the read processing control section 250 (S604). The control block 252 in the read processing control section 250 acquires the filter coefficients set to the register group 251 and sets them to the FIR filter 213 (S605). The FIR filter 213 executes read data equalization processing according to the set filter coefficients.

If the temperature data falls within the low temperature range in the filter coefficient table 450, the POR control block 461 judges whether the acquired temperature data is the first to have been detected as falling within the low temperature range (S606). In this example, no filter coefficients are registered in association with the low temperature range in the filter coefficient table 450 if in the drive life of the hard disk drive 120, the acquired temperature is the first to have been detected as falling within the low temperature range. The POR control block 461 judges the acquired temperature data as the first low temperature and determines to execute the filter coefficient determining process by the filter coefficient determining block 253 (S607).

If it is found in S606 that a temperature in the low temperature range was detected in the past and the filter coefficient determining process was executed, filter coefficients are determined from the filter coefficients registered in the filter coefficient table 450 without executing the filter coefficient determining process 450 (S603) and the determined filter coefficients are set to the register group 251 (S604). Note that by referring to a predefined flag, it is possible to easily judge whether the temperature data is the first low temperature. For example, a flag may be set upon registration of filter coefficients for the first detected low temperature. Since the filter coefficient determining process is executed only after the first low temperature is detected, the time required for the filter coefficient determining process can be minimized.

If it is judged in S606 that the temperature data is the first to have been detected as falling within the low temperature range and therefore it is determined in S607 that the filter coefficient determining process is to be executed by the filter coefficient determining block 253, the POR control block 461 sets a command to the register group 251 to execute the filter coefficient determining process. The filter coefficient determining process is executed by reading out predefined data from the magnetic disk 121. Accordingly, the POR control block 461 instructs the motor driver unit 134 to read out data recorded in a predetermined area by sending a command thereto. Typically, data recorded in an area reserved for not user data but management data is used.

In response to the command from the POR control block 461, the control block 252 controls the filter coefficient determining process. Data for filter coefficient determination is read out by the magnetic heads 122. Like a normal read operation, the output from the magnetic heads 122 is input to the FIR filter 213 via the waveform equalization filter 211 and the AD converter 212. Functioning as a waveform equalizer, the FIR filter 213 executes waveform equalization processing according to the preset filter coefficients (waveform equalization coefficients) and outputs a symbol sequence. The output symbol sequence is input to the filter coefficient determining block 253 without being decoded by the Viterbi decoder 214.

Based on the difference between the acquired symbol sequence and a desired symbol sequence, the filter coefficient determining block 253 determines filter coefficients (S608). This filter coefficient determination can be performed by using any of many widely known algorithms such as the LMS (Least Mean-Square) algorithm and RLS (Recursive Least-Squares) algorithm. In addition, it is also possible to use, for example, the output of the Viterbi decoder 214 in the filter coefficient determining process.

Optimum filter coefficients, determined by the filter coefficient determining block 253, are set to the FIR filter 213 by the control block 252 (S609). Further, the control block 252 sets the filter coefficients to the register group 251. The POR control block 461 acquires the filter coefficients set to the register group 251 and registers the filter coefficients in the filter coefficient table 450 (S610). The filter coefficients, stored in the filter coefficient table 450, are associated with the temperature division of the low temperature range. When the POR procedure is done subsequently, filter coefficients will be determined from those registered in the filter coefficient table 450 according to the temperature data to be acquired from the thermistor 131 and then the filter coefficient determined is set to the FIR filter 213.

Since the filter coefficient determining process is controlled based on the temperature as described above, the filter coefficients can be determined more appropriately. In particular, determination of the filter coefficients in the low temperature range by the hard disk drive 120 contributes much to the appropriate setting of the filter coefficients since manufacturing test is difficult in the low temperature range. In another respect, since the filter coefficient determining process is done only as necessary, the time loss spent by the hard disk 120 may be reduced.

Figure 7:
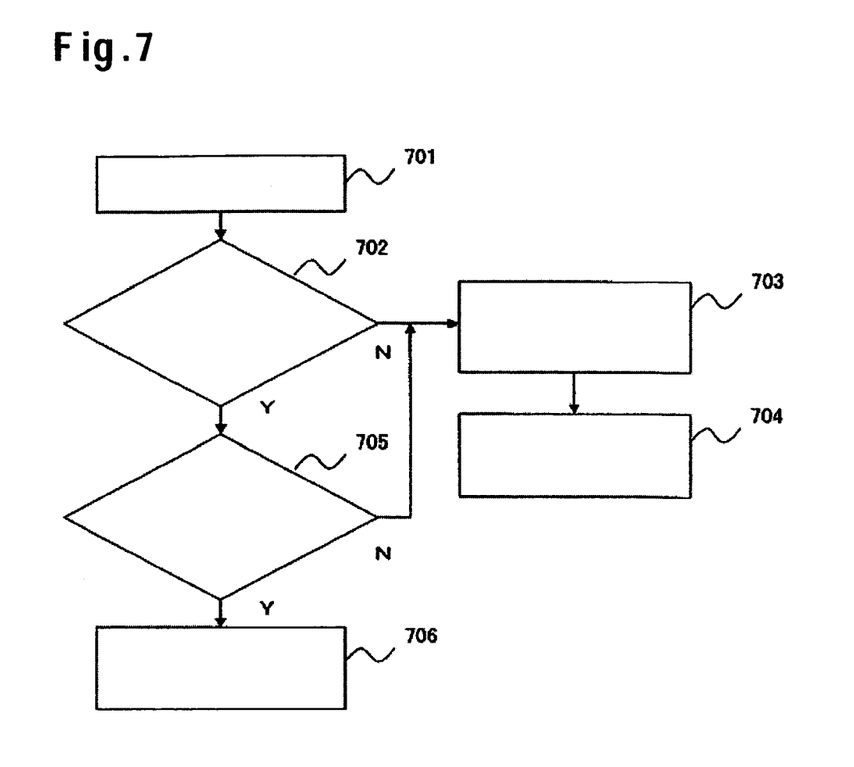
FIG. 7 is a flowchart illustrating another filter coefficient setting process in a POR procedure in this embodiment.

The following describes another example of the filter coefficient setting process. In the above example, the filter coefficient table 450 will never be updated once filter coefficients are registered. In the following example, it is judged whether the detected temperature requires the filter coefficient table 450 to be updated. If so, the filter coefficient determining process is executed. In this example, filter coefficients 452 associated with three temperature ranges 451 are stored in the filter coefficient table 450. In addition, the POR control block 461 stores the temperature data for which filter coefficients in the low temperature range were determined.

With reference to a flowchart of FIG. 7, the filter coefficient setting process is described. The POR control block 461 acquires temperature data from the thermistor 131 (S701). The POR control block 461 judges whether the temperature data belongs to the low temperature range (S702). If the temperature data belongs to the high or middle temperature range, the POR control block 461 acquires filter coefficients from the filter coefficient table 450 and sets them to the register group 251 (S703). Further, the filter coefficients set to the register group 251 are set to the FIR filter 213 (S704). If the temperature data belongs to the low temperature range, the stored temperature data is compared with the acquired data. The stored temperature data indicates a temperature for which filter coefficients were determined as those for the low temperature range in the filter coefficient table 450. It is judged whether the acquired data is lower than the past stored temperature data by a predefined amount or more (S705). For example, it is judged whether the acquired temperature data is lower than the stored temperature data by 10° C. or more.

If the acquired temperature data is not in the above-mentioned range, that is, if the acquired temperature data is not lower by a predefined amount than the stored temperature data, the POR control block 461 acquires the filter coefficients registered for the low temperature range in the filter coefficient table 450 and sets the acquired filter coefficients to the register group 251 (S703). Further, the filter coefficients set to the register group 251 are set to the FIR filter 213 (S704). If the acquired temperature data is in the above-mentioned range, that is, if the acquired temperature data is lower than the stored temperature data by the predefined amount or more, the POR control block 461 determines to execute a filter coefficient determining process (S706). The filter coefficient determining process can be executed through the same procedure as described above with reference to FIG. 6. By allowing the filter coefficient table 450 to be updated according to the detected temperature, the set filter coefficients can be made more adapted to the temperature.

Note that the relation between each process and the corresponding logical configuration is not limited to the examples shown above. For example, the filter coefficient determining process may be executed by microcodes operating on the MPU 129 instead of the read/write channel 127. The MPU 129 can acquire the output of the FIR filter 213 from the read/write channel 127 and determine the filter coefficients according to a predefined algorithm. In addition, although the setting of the filter coefficients is done for the low temperature range in the above examples, the present invention can also be applied to the setting of the filter coefficients for the high temperature range or the like.

Although in the examples described above, the filter coefficient determining process is performed only in pre-defined environmental condition, it is also possible to determine new filter coefficients each time the POR procedure is performed. However, since the filter determining process requires a certain amount of time, it is preferable to use a filter coefficient table where filter coefficients are registered in association with temperatures so as to minimize the number of times the filter coefficient determining process is performed. Note that the parameter setting process can also be executed separately in terms of code and timing from the POR procedure. In addition, the temperature-dependent read parameter setting according to the present invention can be applied not only to FIR filter coefficients but also to analog filter (waveform equalization filter 211) parameters and other read parameters.

Although the magnetic heads 122 in this embodiment are read-write heads capable of performing both write and read operations, the present invention can also be applied to playback-only drives. In addition, the data read processing in the read/write channel 127 is not limited to the examples described above. Also note that although the present invention is particularly useful to magnetic disk drives, it may also be applied to other types of storage devices which drive recording media, such as optical disk drives.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A control method for a storage device having a data storage medium, said control method comprising:
   (a) detecting temperatures;
   (b) based on the temperature detected in step (a), determining whether to execute a parameter setting process based on a signal to be read out from the data storage medium;
   (c) if it is determined to execute the parameter setting process in step (b), reading out a signal from the data storage medium;
   (d) performing signal processing on the signal read out from the data storage medium, wherein said signal processing generates a first resultant signal defined by a first group of one or more parameters;
   (e) based on the first resultant signal of said signal processing in step (d), determining a second group of parameters for said signal processing which is to be performed on a subsequent signal to be read out from the data storage medium; and
   (f) setting the parameters for said signal processing to the second group of parameters.

2. A control method for a storage device according to claim 1, wherein said signal processing in step (d) includes waveform equalization processing by a waveform equalizer and said parameters are waveform equalization coefficients of the waveform equalizer.

3. A control method for a storage device according to claim 1, further comprising:
if it is determined not to execute said parameter setting process in step (b), acquiring parameters which are stored and associated with the detected temperature in step (a),
wherein, the step (f) sets the acquired parameters.

4. A control method for a storage device according to claim 1, wherein it is determined to execute said parameter setting process in step (b) if the temperature detected in step (a) is included in a predefined temperature range.

5. A control method for a storage device according to claim 1, wherein it is determined to execute said parameter setting process in step (b) if:
the temperature detected in step (a) is included in a predefined temperature range; and
said parameter setting process has not been executed for the predefined temperature range based on data read out in the past from the data storage medium.

6. A control method for a storage device according to claim 1, further comprising:
registering in a table the second group of parameters determined in step (e) in association with the temperature.

7. A control method for a storage device according to claim 6 wherein:
the second group of parameters determined in step (e) are registered in the table in association with the temperature detected in step (a); and
after the second group of parameters are registered in the table, if a temperature associated with the registered parameters is detected, the registered parameters are set.

8. A control method for a storage device according to claim 1, wherein if it is determined not to execute said parameter setting process in step (b), parameters determined from previously stored data are set in step (f).

9. A data storage device comprising:
a medium for storing data;
a temperature detecting section configured to detect temperatures;
a signal processing section configured to perform signal processing on a signal read out from the medium, wherein said signal processing generates a first resultant signal defined by a first group of one or more parameters;
a parameter setting section that based on the first resultant signal, determines a second group of parameters for said signal processing which is to be performed on a subsequent signal to be read out from the medium, and that sets the second group of parameters to the signal processing section; and
a control section which based on the temperature detected by the temperature detecting section, controls an execution of a parameter setting process by the parameter setting section.

10. A data storage device according to claim 9, wherein based on the temperature detected by the temperature detecting section, the control section determines whether to execute the parameter setting process by the parameter setting section.

11. A data storage device according to claim 9, wherein the control section controls the parameter setting process so as to execute the parameter setting process if the temperature detected by the temperature detecting section falls within a predefined temperature range.

12. A data storage device according to claim 9, further comprising a table in which parameters are stored in association with temperatures, wherein depending on the temperature detected by the temperature detecting section, parameters stored in the table in association with the detected temperature may be set to the signal processing section by the control section.

13. A data storage device according to claim 12, wherein when the parameter setting process is not to be executed by the parameter setting section, parameters stored in the table in association with the temperature detected by the temperature detecting section are set to the signal processing section by the control section.

14. A data storage device according to claim 12, wherein parameters determined by the parameter setting section are registered in the table by the control section.

15. A data storage device according to claim 14 wherein:
said parameters are registered in the table by the control section in association with the temperature detected by the temperature detecting section; and
if the temperature detected by the temperature detecting section is associated with said parameters registered in the table, said parameters are set to the signal processing section by the control section.

16. A data storage device according to claim 9 wherein:
the signal processing section has a FIR filter; and
the parameter setting section sets filter coefficients to the FR filter.

17. A data storage device according to claim 9, wherein if a temperature falling within a predefined temperature range is detected for the first time, the control section controls the parameter setting section so as to execute the parameter setting process.

18. A data storage device according to claim 9, wherein determining the second group of parameters includes comparing the first resultant signal to a desired signal, wherein the desired signal is stored in a memory that is not the medium for storing data.

19. A data storage device according to claim 18, wherein determining the second group of parameters includes using a fitting method to minimize a difference between a second resultant signal defined by the second group of parameters and the desired signal.

20. A data storage device according to claim 19, wherein the fitting method is a least-mean square algorithm or a recursive least-squares algorithm.

21. A data storage device according to claim 18, wherein the first resultant signal and the desired signal are created by processing a signal corresponding to identical user data, wherein the desired signal was created prior to the desired signal and wherein the desired signal was created at a different temperature than the first resultant signal.

22. A data storage device according to claim 9, wherein said signal processing of the signal processing section shapes and equalizes an input waveform to a target waveform, wherein the second resultant signal defined by the second group of parameters approximates the target waveform.

23. A data storage device according to claim 22, further comprising a second signal processing section that receives a third resultant signal defined by the second group of parameters, wherein the second signal processing section determines a likely data sequence corresponding to a second signal read out from the medium.

24. A data storage device according to claim 23, wherein the second signal processing section is Viterbi decoder.

25. A magnetic disk drive comprising:
 a magnetic disk for storing data;
 a magnetic head which detects a magnetic signal from the magnetic disk and converts the magnetic signal to an electrical signal;
 a signal processing section which performs signal processing on the signal from the magnetic disk; and
 a signal processing control section which controls the signal processing of the signal processing section;
 wherein the signal processing section comprises:
  an analog filter which performs waveform equalization processing on the signal from the magnetic head;
  an AD converter which converts the signal from the analog filter to a digital signal; and
  a FIR filter which performs waveform equalization processing on the signal from the AD converter, wherein the FIR filter generates a first resultant signal defined by one or more initial filter coefficients; and
 wherein the signal processing control section comprises:
  a temperature detecting section configured to detect temperatures;
  a filter coefficient determining section which determines new filter coefficients of the FIR filter based on the first resultant signal; and
  a control section which, if the temperature detected by the temperature detecting section is a predefined temperature, controls the filter coefficient determining section so as to determine the new filter coefficients and sets the new filter coefficients to the signal processing section.

26. A magnetic disk drive according to claim 25 wherein:

the control section has a table to store filter coefficients;

the new filter coefficients determined by the filter coefficient determining section are registered in the table by the control section in association with a predefined temperature range; and if the predefined temperature range is detected by the temperature detection section, the filter coefficients registered in the table are set to the signal processing section by the control section without processing by the filter coefficient determining section.

* * * * *